(12) United States Patent
Kamiya et al.

(10) Patent No.: US 12,026,976 B2
(45) Date of Patent: Jul. 2, 2024

(54) AUTHENTICATION SYSTEM AND AUTHENTICATION METHOD

(71) Applicant: DENSO WAVE INCORPORATED, Chita-gun (JP)

(72) Inventors: Takayoshi Kamiya, Chita-gun (JP); Masahiko Sato, Chita-gun (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 356 days.

(21) Appl. No.: 17/625,929

(22) PCT Filed: Jul. 7, 2020

(86) PCT No.: PCT/JP2020/026518
§ 371 (c)(1),
(2) Date: Jan. 10, 2022

(87) PCT Pub. No.: WO2021/006260
PCT Pub. Date: Jan. 14, 2021

(65) Prior Publication Data
US 2022/0245965 A1  Aug. 4, 2022

(30) Foreign Application Priority Data
Jul. 8, 2019  (JP) ................. 2019-126642

(51) Int. Cl.
G06V 40/16  (2022.01)
G06K 19/07  (2006.01)
G06T 7/70  (2017.01)

(52) U.S. Cl.
CPC ....... *G06V 40/172* (2022.01); *G06K 19/0723* (2013.01); *G06T 7/70* (2017.01); *G06V 40/168* (2022.01); *G06T 2207/30201* (2013.01)

(58) Field of Classification Search
None
See application file for complete search history.

(56) References Cited

U.S. PATENT DOCUMENTS 6,698,653 B1 * 3/2004 Diamond ............... G07C 9/257
                                                        235/382
8,577,053 B1 * 11/2013 Simon .................... H04R 27/00
                                                         381/98

(Continued)

FOREIGN PATENT DOCUMENTS

JP  2003-331323 A  11/2003
JP  2006-040059 A   2/2006
JP  2012-088835 A   5/2012

*Primary Examiner* — Anand P Bhatnagar
(74) *Attorney, Agent, or Firm* — Oliff PLC

(57) ABSTRACT

An authentication system, wherein an RF tag stores a first facial feature point extracted from a captured image of a user's face. In an authentication device, a wireless communication unit wirelessly reads and writes information from and to the RF tag. A controller adjusts wireless communication conditions of the wireless communication unit, and estimates a position of the RF tag according to a distance to the RF tag. The controller adjusts imaging conditions of an imaging unit. A position of the user is detected according to an imaging resulting from the imaging unit. A second facial feature point is extracted from an image of the user's face captured by the imaging unit, and is collated with the first facial feature point read from the RF tag. Based on a collation result, authentication of the user is performed.

15 Claims, 11 Drawing Sheets

(56) References Cited

U.S. PATENT DOCUMENTS

| | | | |
|---|---|---|---|
| 8,618,913 B1* | 12/2013 | Bailey | G06F 3/017 |
| | | | 340/10.1 |
| 9,961,489 B2* | 5/2018 | Elias | H04W 4/029 |
| 10,200,812 B2* | 2/2019 | Elias | H04W 12/06 |
| 2006/0022814 A1 | 2/2006 | Nogami et al. | |
| 2009/0322477 A1* | 12/2009 | Celorio | G07C 9/257 |
| | | | 340/5.82 |
| 2015/0221151 A1 | 8/2015 | Bacco et al. | |
| 2018/0014150 A1* | 1/2018 | Elias | G07C 9/28 |
| 2018/0206068 A1* | 7/2018 | Elias | H04L 63/0861 |
| 2019/0310637 A1* | 10/2019 | Dean | G06T 7/292 |
| 2020/0094777 A1 | 3/2020 | Heinrich | |
| 2020/0351537 A1* | 11/2020 | Browy | G06T 19/003 |
| 2022/0334580 A1* | 10/2022 | Dean | B60W 30/0956 |

\* cited by examiner

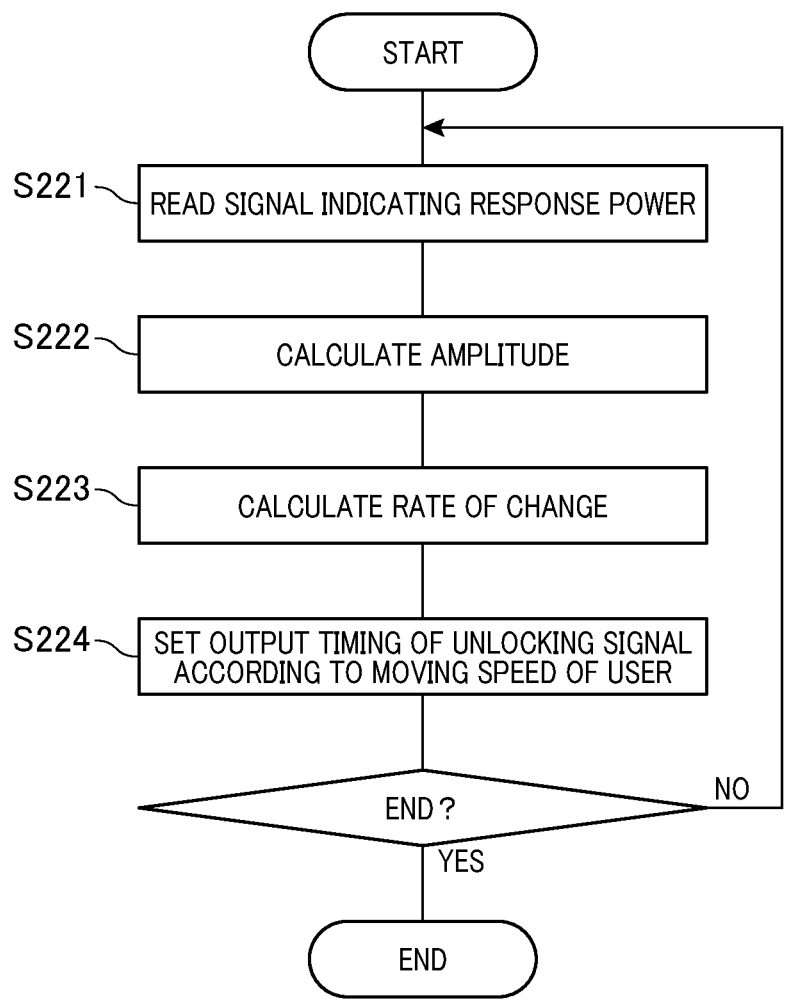

AUTHENTICATION SYSTEM AND AUTHENTICATION METHOD

CROSS-REFERENCE TO RELATED APPLICATION

This application is based on and claims the benefit of priority from earlier Japanese Patent Applications No. 2019-126642 filed on Jul. 8, 2019 the description of which is incorporated herein by reference.

BACKGROUND

Technical Field

The present disclosure relates to an authentication system and an authentication method using an RF tag, and more specifically to a system and a method of, for example, performing authentication of a subject using information stored in advance in the RF tag at a site of authentication.

Related Art

As an authentication system using an RF tag such as RFID, combined authentication has been proposed. In the combined authentication, an ID number or the like stored in the RF tag is associated with biometric information of a person to be authenticated and stored in a database of an authentication device, and authentication is performed by combining biometric authentication that performs identification based on a facial image with authentication using the ID number or the like read from the RF tag. For example, a combined authentication device disclosed in PTL 1 is known as a technique related to the combined authentication.

The combined authentication device disclosed in PTL 1 is configured to perform identification by collating biometric information retrieved from the biometric registration information storage unit based on RFID tag information read by the RFID reading unit with biometric information read by the biometric information reading unit. In particular, the combined authentication device disclosed in PTL 1 can set authentication conditions as appropriate by using additional information associated with the RFID tag information.

CITATION LIST

Patent Literature

[PTL 1] JP 2012-088835 A

In a system configuration applied to the combined authentication device disclosed in PTL 1, biometric information for authentication is stored in the database or the like of the authentication device. In this system configuration, the biometric information itself is confidential information. Therefore, the combined authentication device disclosed in PTL 1 has a problem that the cost for security measures or management of biometric information tends to increase. In order to solve the problem, for example, it is possible to eliminate the need of managing confidential information in the authentication device by storing the facial feature points extracted from the facial image of the user in advance in the RF tag carried by the user, and collating the facial feature points read from the RF tag of the user at the time of authentication with the facial feature points extracted from the facial image of the user.

However, in a configuration in which the position of the user relative to the authentication device changes at each time of authentication, there may be cases, depending on the position of the user to be authenticated, where the facial image for extracting the facial feature points cannot be captured while the facial feature points can be read from the RF tag, or where the facial feature points cannot be read from the RF tag while the facial feature points can be extracted from the facial image. In such cases, a notification that authentication is not permitted is given to the user, and the user is required to change the position relative to the authentication device. This prevents smooth authentication.

SUMMARY

By the following various aspect, the present disclosure aims to provide a configuration capable of increasing situations available for authentication and ensuring smooth authentication even when the authentication requires extraction of the facial feature points from the captured image and reading of the RF tag.

A first aspect of the present disclosure provides an authentication system including:
an authentication device that performs authentication of a user based on information stored in advance in an RF tag carried by the user, wherein
the RF tag stores a facial feature point extracted from a captured image of the user's face in advance as a first facial feature point which constitutes part of the information,
the authentication device includes:
a wireless communication unit configured to wirelessly read and write the information from and to the RF tag;
an RF tag position estimation unit that estimates a position of the RF tag according to a distance to the RF tag detected based on at least a response wave from the RF tag;
an imaging unit that captures an image of the user's face;
an imaging condition adjustment unit that adjusts imaging conditions of the imaging unit;
an extraction unit that extracts a facial feature point as a second facial feature point from an image of the user's face captured by the imaging unit;
a collation unit that collates the first facial feature point read from the RF tag by the wireless communication unit with the second facial feature point extracted by the extraction unit; and
an authentication unit that performs authentication of the user based on a collation result from the collation unit, and
the imaging condition adjustment unit adjusts the imaging conditions according to a position of the RF tag estimated by the RF tag position estimation unit.

Furthermore, another aspect in which the above authentication system is implemented as an authentication method is also provided.

A second aspect of the present disclosure provides an authentication system including:
an authentication device that performs authentication of a user based on information stored in advance in an RF tag carried by the user, wherein
the RF tag stores a facial feature point extracted from a captured image of the user's face in advance as a first facial feature point which constitutes part of the information,
the authentication device includes:
a wireless communication unit configured to wirelessly read and write the information from and to the RF tag;

a wireless communication condition adjustment unit that adjusts wireless communication conditions of the wireless communication unit;

an imaging unit that captures an image of the user's face;

a user position detecting unit that detects a position of the user according to an imaging result from the imaging unit;

an extraction unit that extracts a facial feature point as a second facial feature point from an image of the user's face captured by the imaging unit;

a collation unit that collates the first facial feature point read from the RF tag by the wireless communication unit with the second facial feature point extracted by the extraction unit; and an authentication unit that performs authentication of the user based on a collation result from the collation unit, and the wireless communication condition adjustment unit adjusts the wireless communication conditions according to a position of the user detected by the user position detecting unit.

A third aspect of the present disclosure provides an authentication system including:

an authentication device that performs authentication of a user based on information stored in advance in an RF tag carried by the user, wherein the RF tag stores a facial feature point extracted from a captured image of the user's face in advance as a first facial feature point which constitutes part of the information, the authentication device includes:

a wireless communication unit configured to wirelessly read and write the information from and to the RF tag;

a wireless communication condition adjustment unit that adjusts wireless communication conditions of the wireless communication unit;

an RF tag position estimation unit that estimates a position of the RF tag according to a distance to the RF tag detected based on at least a response wave from the RF tag;

an imaging unit that captures an image of the user's face;

an imaging condition adjustment unit that adjusts imaging conditions of the imaging unit;

a user position detecting unit that detects a position of the user according to an imaging result from the imaging unit;

an extraction unit that extracts a facial feature point as a second facial feature point from an image of the user's face captured by the imaging unit;

a collation unit that collates the first facial feature point read from the RF tag by the wireless communication unit with the second facial feature point extracted by the extraction unit; and an authentication unit that performs authentication of the user based on a collation result from the collation unit, the imaging condition adjustment unit adjusts the imaging conditions according to a position of the RF tag estimated by the RF tag position estimation unit when the first facial feature point is read by the wireless communication unit before the second facial feature point is extracted by the extraction unit, and the wireless communication condition adjustment unit adjusts the wireless communication conditions according to a position of the user detected by the user position detecting unit when the second facial feature point is extracted by the extraction unit before the first facial feature point is read by the wireless communication unit.

The reference signs in parenthesis indicate the corresponding relationship with the specific elements in the embodiments described below.

In the first aspect, the collation unit collates the first facial feature point read from the RF tag by the wireless communication unit with the second facial feature point extracted by the extraction unit from the user's facial image captured by the imaging unit. Based on the collation result, authentication of the user is performed. In the authentication, the imaging condition adjustment unit adjusts the imaging conditions for the user's facial image according to a position of the RF tag estimated by the RF tag position estimation unit.

The position of the RF tag estimated by the RF tag position estimation unit can be regarded as the position of the user. Accordingly, even when the user is located at a position where the facial feature points cannot be extracted from the facial image relative to the imaging unit, it is possible for the imaging condition adjustment unit to adjust the imaging conditions such as a focal distance, an angle of view, an imaging direction, and a white balance according to the position of the RF tag estimated in advance, that is, the position of the user. Accordingly, it is possible to increase the possibility of extracting the facial feature points from the facial image captured after the adjustment. Therefore, even when the authentication requires extraction of the facial feature points from the captured image and reading of the RF tag, it is possible to ensure smooth authentication.

In the second aspect, the collation unit collates the first facial feature point read from the RF tag by the wireless communication unit with the second facial feature point extracted by the extraction unit from the user's facial image captured by the imaging unit. Based on the collation result, authentication of the user is performed. In the authentication, the wireless communication condition adjustment unit adjusts the wireless communication conditions according to a position of the user detected by the user position detecting unit.

The position of the user detected by the user position detecting unit can be regarded as the position of the RF tag. Accordingly, even when the RF tag is located at a position where it is difficult to be read by the wireless communication unit, it is possible for the wireless communication condition adjustment unit to adjust the wireless communication conditions of the wireless communication unit, such as radio wave output and radio wave radiation direction, according to the position of the user detected in advance, that is, the position of the RF tag. Accordingly, it is possible for the wireless communication unit to increase the possibility of reading the first facial feature points from the RF tag after the adjustment. Therefore, even when the authentication requires extraction of the facial feature points from the captured image and reading of the RF tag, it is possible to ensure smooth authentication.

In the third aspect, the collation unit collates the first facial feature point read from the RF tag by the wireless communication unit with the second facial feature point extracted by the extraction unit from the user's facial image captured by the imaging unit. Based on the collation result, authentication of the user is performed. In the authentication, the imaging condition adjustment unit adjusts the imaging conditions according to a position of the RF tag estimated by the RF tag position estimation unit when the first facial feature point is read by the wireless communication unit before the second facial feature point is extracted by the extraction unit. Further, the wireless communication condition adjustment unit adjusts the wireless communication conditions according to a position of the user detected by the user position detecting unit when the second facial feature point is extracted by the extraction unit before the first facial feature point is read by the wireless communication unit.

With this configuration, even when the user is located at a position where the facial feature points cannot be extracted from the facial image relative to the imaging unit, it is possible for the imaging condition adjustment unit to adjust the imaging conditions such as a focal distance, an angle of view, an imaging direction, and a white balance according to the estimated position of the RF tag, that is, the position of the user when the position of the RF tag is estimated by the RF tag position estimation unit. Accordingly, it is possible to increase the possibility of extracting the facial feature points from the facial image captured after the adjustment. On the other hand, even when the RF tag is located at a position where it is difficult to be read by the wireless communication unit, it is possible for the wireless communication condition adjustment unit to adjust the wireless communication conditions of the wireless communication unit, such as radio wave output and radio wave radiation direction, according to the detected position of the user, that is, the position of the RF tag when the position of the user is detected by the user position detecting unit. Accordingly, it is possible for the wireless communication unit to increase the probability of reading the first facial feature points from the RF tag after the adjustment. Therefore, even when the authentication requires extraction of the facial feature points from the captured image and reading of the RF tag, it is possible to ensure smooth authentication.

In another example, when a collation score corresponding to a match rate between the first facial feature point and the second facial feature point becomes a predetermined threshold or higher as a collation result by the collation unit, the wireless communication unit overwrites the first facial feature point stored in the RF tag to match the second facial feature points extracted by the extraction unit.

In a system configuration in which the first facial feature point stored in the RF tag is not updated, authentication tends to gradually become difficult due to aging of the user's face or the like. The above issue of authentication can be solved by regularly updating the first facial feature point stored in the RF tag. However, this requires preparing a user's facial image for authentication for each updating, which is time and effort consuming. Further, since the facial feature point is personal information, confidential matters need to be managed by a responsible person. In this sense as well, there is a problem that updating work is time and effort consuming.

Therefore, when the collation score becomes the predetermined threshold or higher, the first facial feature point stored in the RF tag is overwritten by the wireless communication unit to match the second facial feature point extracted by the extraction unit. Accordingly, the user, the administrator, or the like are not required to perform the updating work, and thus time and effort for updating can be eliminated. In particular, since the second facial feature point having the collation score of a predetermined threshold or higher is reliable as the facial feature point for use in authentication, it is possible to store reliable facial feature point as the first facial feature point in the RF tag.

In still another example, the RF tag stores date and time of writing at which the first facial feature point is written, and, when the collation score becomes the predetermined threshold or higher, the wireless communication unit overwrites the first facial feature point for which a predetermined period of time has elapsed from the date and time of writing to match the second facial feature point.

Therefore, it is possible to prevent the first facial feature point for which a predetermined period of time has not elapsed from the date and time of writing from being taken as a target to be updated, and thus prevent the first facial feature point stored in the RF tag from being updated at each time the collation score becomes a predetermined threshold or higher. Accordingly, unnecessary updating of the first facial feature point can be prevented.

In still another example, a plurality of the first facial feature points are written in the RF tag together with the date and time of writing for each of the first facial feature points. Therefore, for example, by overwriting the oldest one from among the plurality of first facial feature points to match the second facial feature points, a plurality of patterns of the first facial feature points can be held. In particular, even when overwriting of one first facial feature point fails due to the RF tag moving to the outside of the communication range of the wireless communication unit during updating, authentication can be performed using the other first facial feature points. Therefore, it is possible to prevent authentication from being disabled due to such an overwriting failure.

In still another example, when overwriting by the wireless communication unit fails, the wireless communication condition adjustment unit adjusts the wireless communication conditions according to a position of the user detected by the user position detecting unit. Accordingly, a success rate of overwriting by the wireless communication unit after the adjustment can be increased.

BRIEF DESCRIPTION OF DRAWINGS

In the accompanying drawings:

FIG. 11 is a flowchart illustrating a concept of a procedure executed by a management controller in the third embodiment.

DESCRIPTION OF THE PREFERRED EMBODIMENTS

First Embodiment

With reference to the drawings, a first embodiment in which an authentication system and an authentication method according to the present disclosure are applied to an access and exit control system will be described below.

Figure 1:
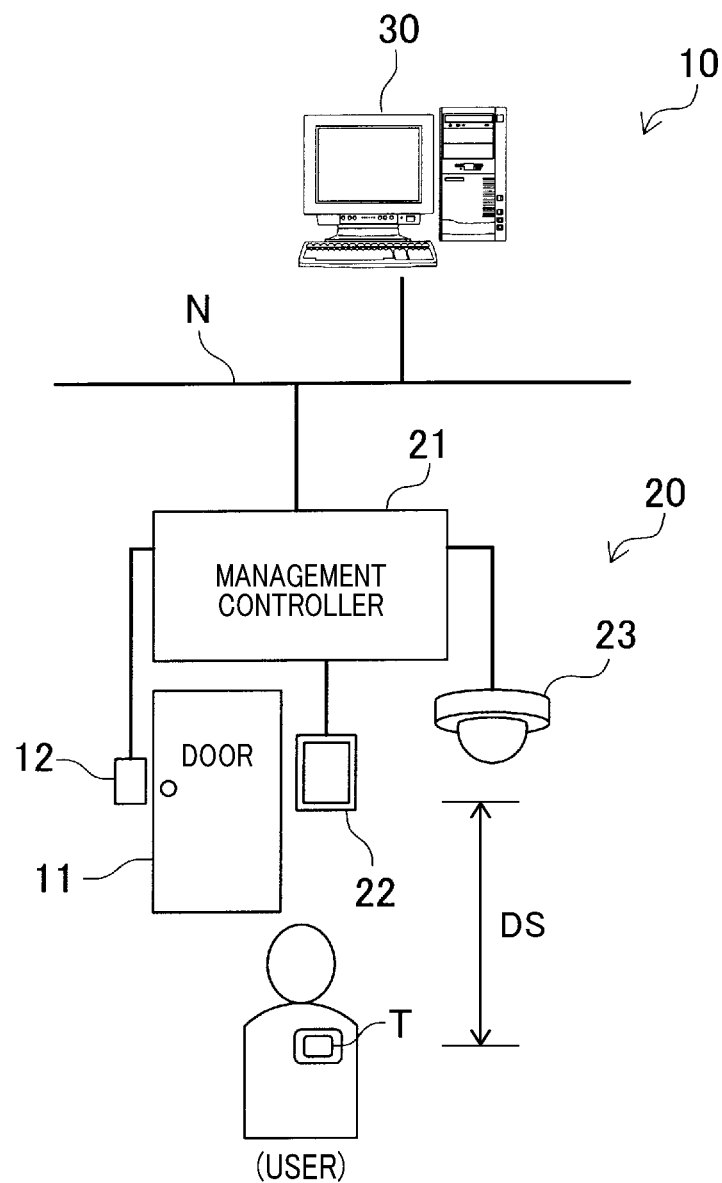
FIG. 1 is a diagram schematically illustrating an access and exit control system according to a first embodiment.

As shown in FIG. 1, an access and exit control system 10 according to the present embodiment is an authentication system that controls access and exit to and from a room where access is restricted. The access and exit control system 10 includes an access and exit control device 20 that locks/unlocks an electric lock 12 disposed on a door 11, and a server 30 that manages an authentication history in the access and exit control device 20.

The door 11 may be, for example, a sliding type or a rotating type. The electric lock 12 is an electromagnetic key, and is disposed, for example, on a wall surface near the door 11 to be locked/unlocked. The electric lock 12 is configured to maintain a locked state when receiving a locking signal and perform an unlock operation when receiving an unlocking signal. Various known electric locks configured to lock and unlock the door 11 by electrical control can be used as the electric lock 12.

Figure 2:
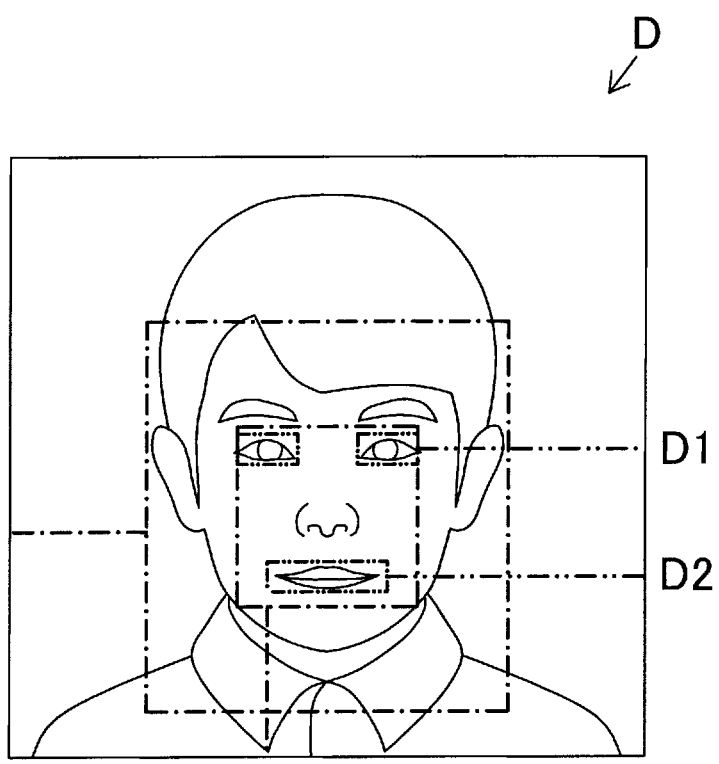
FIG. 2 is a diagram schematically illustrating a part of a portion of a captured facial image data where facial feature points are extracted.

In the access and exit control system 10 according to the present embodiment, a user carries an RF tag T, in which facial feature points extracted from a facial image of the user are stored as authentication information, and authentication of the user is performed using these facial feature points. In the present embodiment, items such as sizes, shapes, and outlines of each of facial organs such as eyes, eyebrows, nose, ears, and mouth, and positions of the facial organs relative to each other are used as the facial feature points. According to known facial feature point extraction performed on the user's facial image to extract facial feature points, features for each item, for example, data such as "D1: narrow eyes" and "D2: large mouth" are calculated and extracted as facial feature points from facial image data D obtained as shown in FIG. 2. The facial feature point extraction is performed by, for example, specifying the sizes, shapes, and outlines of each of facial organs such as eyes, eyebrows, nose, ears, and mouth, and positions of the facial organs relative to each other based on the edge pixels, positions of the edge pixels, and histogram calculated by edge extraction or histogram calculation performed on the facial image of the user.

Figure 3:
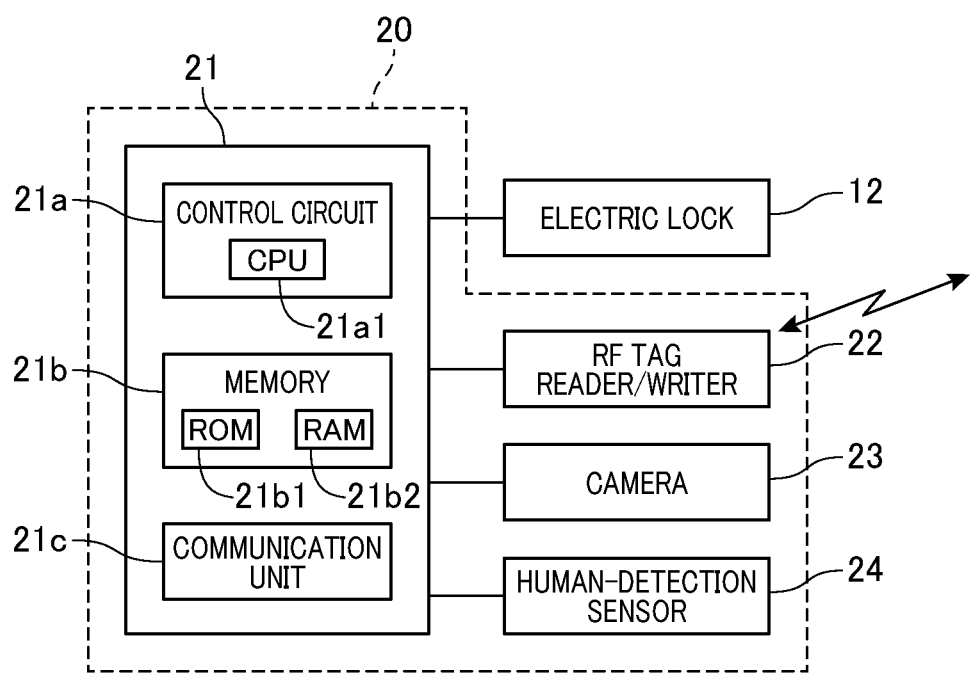
FIG. 3 is a block diagram schematically illustrating an electrical configuration of an access and exit control device.

With reference to FIG. 3, the access and exit control device 20 will now be described.

The access and exit control device 20 is configured to function as an authentication device that performs authentication of a user by using an RF tag T of the user and a facial image captured at the site. As shown in FIG. 3, the access and exit control device 20 includes a management controller 21, an RF tag reader/writer 22, a camera 23, a human-detection sensor 24, and the like. In the present embodiment, specifically, authentication is performed using a user's facial image captured at the time of authentication of a user, not a user's facial image captured in advance.

The management controller 21 includes a control circuit 21a, a memory 21b, a communication unit 21c, and the like, and is mainly configured with a microcomputer. The control circuit 21a includes, for example, a CPU (central processing unit) 21a1 that is responsible for arithmetic operations. The control circuit 21a (CPU 21a1) controls the entire management controller 21 and performs a predetermined authentication by reading and executing a control program stored in advance in the memory 21b. The CPU 21a1 may be referred to as another name (e.g., processor or arithmetic unit) as long as it is an element mainly responsible for arithmetic operations in a computer system and has a similar function. The management controller 21 is configured to electrically obtain information from the RF tag reader/writer 22, the camera 23, the human-detection sensor 24, and the like via the communication unit 21c, and execute various information processing according to the obtained information. The authentication executed by the control circuit 21a (that is, CPU 21a1) will be described later.

Further, the management controller 21 is configured to control the electric lock 12 via the communication unit 21c, and outputs a locking signal to the electric lock 12 for locking and an unlocking signal for unlocking according to the locking/unlocking procedure described later.

The memory 21b is configured to be readable by a known storage medium such as a ROM (read-only memory) 21b1, a RAM (random-access memory) 21b2, or a non-volatile memory, which functions as a non-transitory computer readable recording medium. The memory 21b stores a program procedure for executing a predetermined locking/unlocking procedure as a source code. Further, the memory 21b is configured to store images captured by the camera 23.

The communication unit 21c is configured with, for example, a LAN interface, and functions as an interface for wireless communication or wired communication with external devices such as the RF tag reader/writer 22, the camera 23, the human-detection sensor 24, the electric lock 12, and the server 30.

The RF tag reader/writer 22 can correspond to an example of a "wireless communication unit" that can read/write information (data) from and to the RF tag T located several meters away, and is configured as an RF tag reader/writer that reads/writes an RF tag such as an RFID by a wireless communication method. The RF tag reader/writer 22 is disposed on a wall surface near the door 11, and functions to output information read from the RF tag T in a wireless communication range to the management controller 21, and write a predetermined information to the RF tag T when receiving a write instruction from the management controller 21.

In particular, in the present embodiment, the RF tag reader/writer 22 is configured such that the wireless communication conditions such as radio wave output and radio wave radiation direction can be controlled by the management controller 21. Accordingly, when the position of the RF tag T relative to the RF tag reader/writer 22 is estimated, the wireless communication conditions such as radio wave output power and radio wave radiation direction can be adjusted according to the estimated position of the RF tag T to thereby increase a success rate of writing to the RF tag T.

The RF tag T, which is a communication target of the RF tag reader/writer 22 configured as above, may be attached to, for example, an employee ID or the like that is always carried by a user who is permitted to access and exit the room. The RF tag T stores a unique ID number for identifying the user as well as facial feature points extracted as described above from the image of the user's face as first facial feature points.

The camera 23 can correspond to an example of an "imaging unit," and is configured with, for example, a camera (e.g., CCD camera and CMOS camera) that captures an image with a solid-state imaging element. The camera 23, disposed on a ceiling or a wall surface, captures an image of a face of a person approaching the door 11 to enter the room.

In particular, in the present embodiment, the camera 23 is configured such that imaging conditions such as a focal distance (focus), an angle of view (viewing angle), an imaging direction, and a white balance can be controlled by the management controller 21. Accordingly, when the position of the user relative to the camera 23 is detected, imaging conditions such as a focal distance, an angle of view, an imaging direction, and a white balance can be adjusted according to the detected position of the user so that a facial image that facilitates extraction of facial feature points can be captured.

The human-detection sensor 24 is configured with, for example, an infrared sensor, an ultrasonic sensor, a visible light sensor, and the like, and is disposed on a ceiling or a wall surface to detect when a user enters an area that can be imaged by the camera 23 at initial imaging conditions. Upon detecting a user who wants to enter the room, the human-detection sensor 24 functions to output a predetermined detection signal to the management controller 21.

Figure 4:
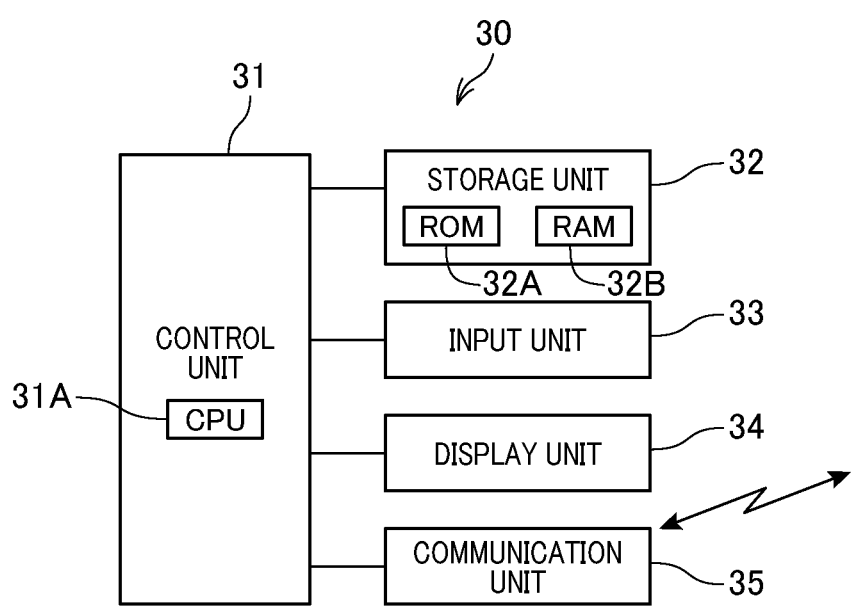
FIG. 4 is a block diagram schematically illustrating an electrical configuration of a server.

Next, with reference to FIG. 4, the server 30 will now be described.

The server 30 is mainly configured with a computer that controls authentication history, access and exit permission information, and the like in the access and exit control device 20, and is communicable with the access and exit control device 20 via a network N such as an internal LAN. As shown in FIG. 4, the server 30 includes: a control unit 31 that integrally controls the entire server 30; a storage unit 32 composed of a ROM 32A, a RAM 32B, an HDD, and the like; an input unit 33 configured with an input medium such as a mouse or a keyboard to which external information is input; a display unit 34 configured with a display medium such as a liquid crystal monitor that visually displays information; and a communication unit 35 such as a LAN interface configured to transmit and receive external information.

The storage unit 32 stores an authentication history database in which authentication success information, authentication failure information, and the like received from the access and exit control device 20 are sequentially stored as described later. For example, the control unit 31 can analyze the authentication history database and recognize the authentication history including the entrance history of the room in which the access and exit control device 20 is provided.

Figure 5:
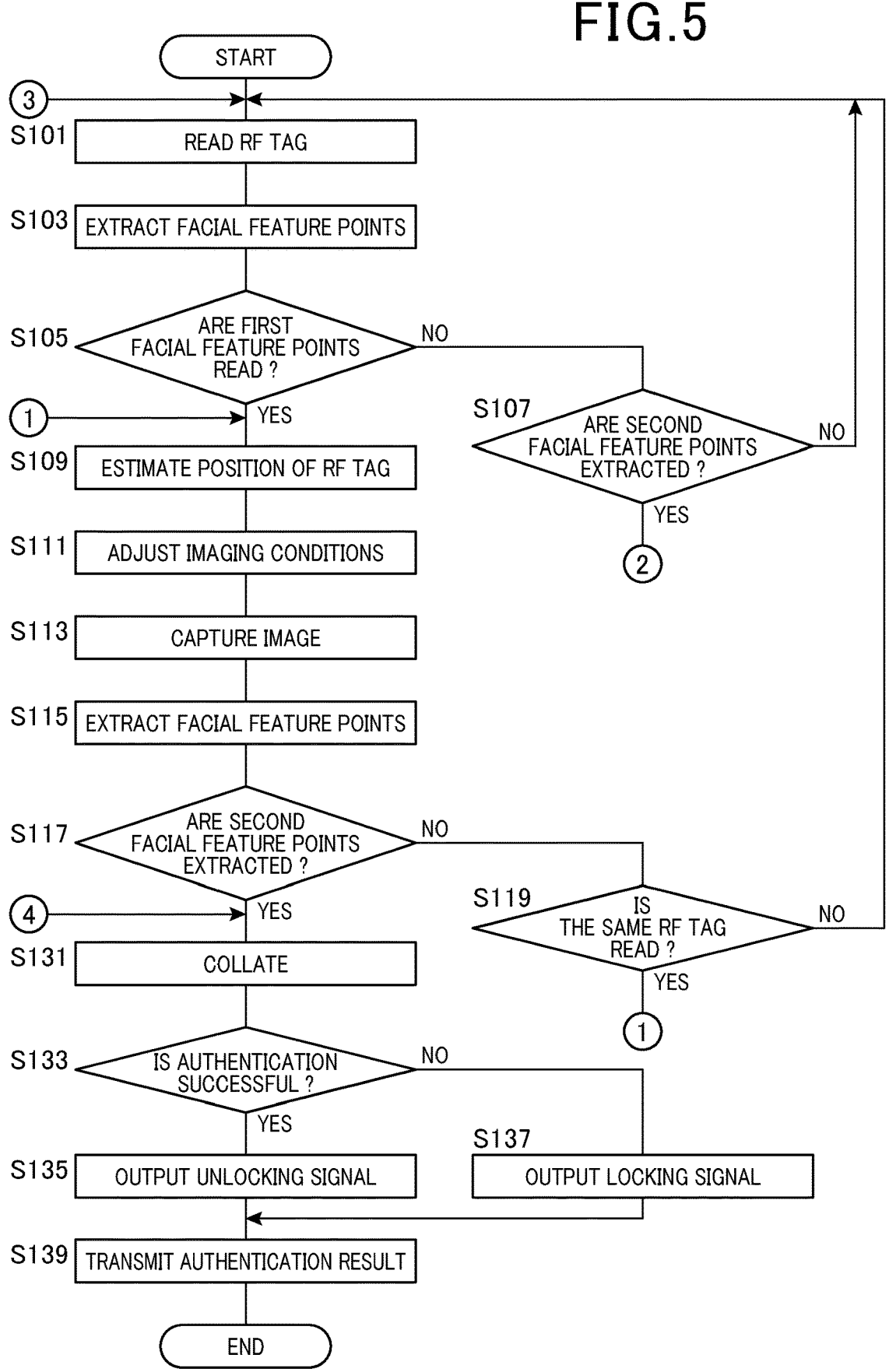
FIG. 5 is a part of a flowchart illustrating a flow of a locking/unlocking procedure performed by a management controller of an access and exit control device according to the first embodiment.

With reference to the flowchart shown in FIGS. 5 and 6, the following description will be given of a locking/unlocking procedure that is started by the control circuit 21a (that is, CPU 21a1) of the management controller 21 in the access and exit control device 20 having the above configuration at a regular time interval in the main routine or when a predetermined start condition is satisfied in the main routine.

When the locking/unlocking procedure is started by the control circuit 21a, the RF tag T is read by the RF tag reader/writer 22 under predetermined wireless communication conditions (S101 in FIG. 5), and a process to extract facial feature points from an image captured by the camera 23 under predetermined imaging conditions is performed (S103). If the first facial feature points are not read from the RF tag T (No in S105) and an image of a person's face for extracting facial feature points is not captured (No in S107), the steps from the above step S101 onward are repeated. It is also possible to set the steps from step S101 onward to be executed when the human-detection sensor 24 detects a person approaching the door 11. For example, a predetermined detection signal can be output to the management controller 21 when the human-detection sensor 24 continuously detects a person for a predetermined period of time (for example, 0.5 sec), and the management controller 21 can start the locking/unlocking procedure when receiving the detection signal.

While the steps from step S101 onward are repeated, if the first facial feature points, the ID number, and the like stored in the RF tag T are read by the RF tag reader/writer 22 (Yes in S105) in a state where a facial image for extracting facial feature points is not captured, for example, due to the user approaching the door 11 from the blind spot of the camera 23 (No in S107), RF tag position estimation at step S109 is performed. In the step of RF tag position estimation, at least a distance DS from the RF tag reader/writer 22 to the RF tag T (that is, the user) can be calculated based on the received signal strength indication (RSSI) or a change in the RSSI of a response wave from the RF tag T (see FIG. 1). Based on the information of the distance DS, the position of the RF tag T can be estimated. That is, in the scene of access and exit control according to the present embodiment, at least the distance DS is calculated to estimate on which side of the door the RF tag T is located based on the information of the distance DS. Furthermore, two RF tag readers/writers 22 may also be provided apart from each other so that the direction of the RF tag T relative to the two RF tag readers/writers 22 can be calculated. In this case, the position of the RF tag T relative to the RF tag readers/writers 22 may be more accurately estimated taking into consideration the calculated direction.

The management controller 21 that executes the above RF tag position estimation corresponds to an example of an "RF tag position estimation unit."

When the position of the RF tag T is thus estimated, imaging condition adjustment at step S111 is performed. In step S111, on the assumption that the user is at the estimated position of the RF tag T, imaging conditions of the camera 23, specifically, a focal distance, an angle of view, an imaging direction, a white balance, and the like are adjusted for imaging the face of user who is at the estimated position of the RF tag T. The management controller 21 that executes the above imaging condition adjustment corresponds to an example of an "imaging condition adjustment unit."

Subsequently, in step S113, imaging is performed to capture an image of the user who is at the estimated position of the RF tag T under the imaging conditions adjusted as described above. Then, in facial feature point extraction at step S115, a process to extract facial feature points as second facial feature points from the captured image is performed. The management controller 21 that executes the above facial feature point extraction corresponds to an example of an "extraction unit."

Subsequently, in step S117, determination is performed to determine whether facial feature points are extracted from the captured image. If it is determined that facial feature points are not extracted (No in S117), determination at step S119 is performed to determine whether the RF tag T that is read is the same RF tag that has been read at step S101. When it is determined that the same RF tag T is continuously read, a Yes determination is made, and the steps from the above step S109 onward are repeated. In the step of determination at step S119, for example, it is determined whether the ID number read at step S119 matches the ID number that has been read at step S101. When they match, it is determined that the same RF tag is continuously read. While the steps are repeated, if the same RF tag T is no longer read (No in S119), it is determined that the RF tag T of a user who does not desire to be authenticated is read, and the steps from the above step S101 onward are performed.

On the other hand, if the second facial feature points are extracted from the captured image while the same RF tag is continuously read (Yes in S119), it is determined Yes in step S117. Thus, the first facial feature points read from the RF tag T of the person approaching the door 11 and the second facial feature points extracted from the facial image of the person are obtained.

Figure 6:
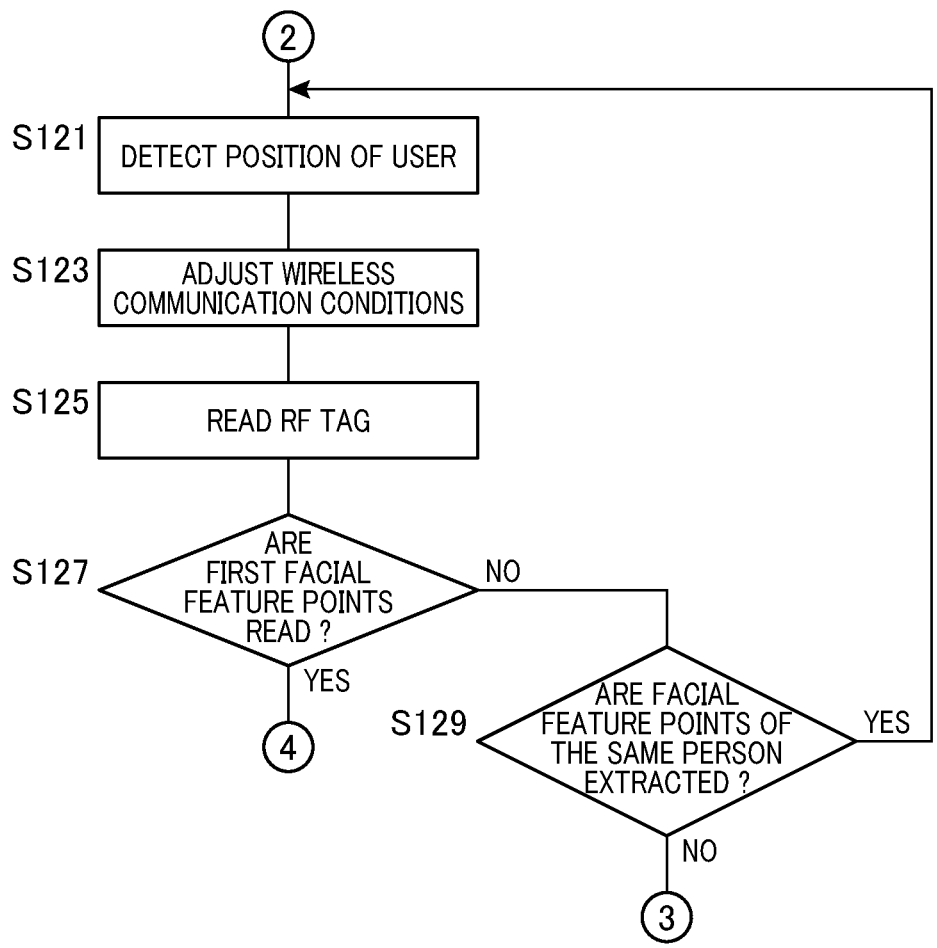
FIG. 6 is a part of a flowchart illustrating a flow of a locking/unlocking procedure performed by a management controller of an access and exit control device according to the first embodiment.

Further, while the steps from step S101 onward are repeated, if the second facial feature points are extracted from the facial image captured by the camera 23 (Yes in S107) in a state where the first facial feature points are not read from the RF tag T (No in S105), user position detection at step S121, which is shown in FIG. 6, is performed. In step S121, the position of the user relative to the camera 23 is detected based on the imaging result from the camera 23, specifically, the region occupied by the user in the captured image, or the like. The management controller 21 that executes the above user position detection corresponds to an example of a "user position detecting unit."

When the position of the user is thus detected, wireless communication condition adjustment at step S123 is performed. In the step of wireless communication condition adjustment at step S123, on the assumption that the RF tag T is located at the detected position of the user, the wireless communication conditions of the RF tag reader/writer 22, specifically, for example, radio wave output, radio wave radiation direction, and the like are adjusted to the conditions suitable for reading the RF tag T located at the detected position of the user. The management controller 21 that executes the above wireless communication condition adjustment corresponds to an example of a "wireless communication condition adjustment unit."

Subsequently, in step S125, RF tag reading is performed to read the RF tag T located at the detected position of the user under the wireless communication conditions adjusted as described above. Then, in step S127, determination is performed to determine whether the first facial feature points and the like are read from the RF tag T. If it is determined that the first facial feature points and the like are not read (No in S127), determination at step S129 is performed to determine whether the facial feature points of the same person are extracted. When the facial feature points of the same person are continuously extracted, it is determined Yes, and the steps from the above step S121 onward are repeated. While the steps are repeated, if the facial feature points of the same person are no longer detected (No in S129), it is determined that the facial image of a user who does not desire to be authenticated is captured, and the steps from the above step S101 onward are performed.

On the other hand, if the first facial feature points, ID number, and the like are read from the RF tag T while the facial feature points of the same person are continuously detected (Yes in S129), it is determined Yes in step S127. Thus, the second facial feature points extracted from the facial image of the person approaching the door 11 and the first facial feature points read from the RF tag T carried by the person are obtained.

Thus, when the second facial feature points are extracted from the captured image (Yes in S117) after the first facial feature points are read from the RF tag T, or when the first facial feature points are read from the RF tag T (Yes in S127) after the second facial feature points are extracted from the captured image, collation at step S131 is performed. In the step of collation at step S131, the first facial feature points read from the RF tag T as described above are collated (or compared) with the second facial feature points extracted from the captured image. The management controller 21 that executes the above collation (or comparison) corresponds to an example of a "collation (or comparison) unit."

As a result of the collation, for example, when a collation score corresponding to a match rate between the first facial feature points and the second facial feature points becomes a specified value or higher, it is determined that the authentication is successful (Yes in S133). Then, unlocking signal output at step S135 is performed to output an unlocking signal to the electric lock 12 (S135). Accordingly, the electric lock 12 is unlocked for a predetermined period of time so that the user can enter a desired room. The management controller 21 that determines the authentication is successful when the collation score becomes a specified value or higher corresponds to an example of an "authentication unit" that performs authentication of the user based on the collation result.

In step S139, authentication result transmission is performed to transmit authentication success information, such as information, ID number, date and time information, and the like regarding the collation result of authentication success, to the server 30. As described above, in the present embodiment, the first facial feature points read from the RF tag T and the second facial feature points extracted from the facial image captured by the camera 23 are used for authentication. Therefore, it is not necessary to store confidential information such as facial feature points in advance in the access and exit control device 20, the server 30, or the like, and face authentication can be performed offline.

On the other hand, when the collation score becomes less than a specified value, it is determined that the authentication has failed (No in S133). Then, locking signal output at step S137 is performed to output a locking signal to the electric lock 12. In this case, since the electric lock 12 remains locked, the door 11 remains closed so that the user cannot enter the room. In this case as well, the step of authentication result transmission at step S139 is performed to transmit authentication failure information, such as information, ID number, date and time information, and the like regarding the collation result of authentication failure, to the server 30.

The above authentication result transmission may be performed at each time collation is performed, or may be performed collectively at a predetermined transmission timing. In particular, in a configuration in which the authentication result is transmitted to the server 30 at each time collation is performed, authentication restriction information may be transmitted to the access and exit control device 20 to restrict authentication at the time of authentication success in the access and exit control device 20 if the ID number included in the authentication success information coincides with the ID number registered in a predetermined negative list which indicates the list that should not be authenticated in the server 30.

As described above, in the access and exit control system 10 according to the present embodiment, the first facial feature points read from the RF tag T by the RF tag reader/writer 22 are collated with the second facial feature points extracted from the user's facial image captured by the camera 23 in the collation step (S131), and authentication of the user is performed based on the collation result. If the first facial feature points are read by the RF tag reader/writer 22 (Yes in S105) before the second facial feature points are extracted in the extraction step, the imaging conditions are adjusted according to the estimated position of the RF tag T in the imaging condition adjustment step (S111). Further, if the second facial feature points are extracted in the extraction step (Yes in S107) before the first facial feature points are read by the RF tag reader/writer 22, the wireless communication conditions are adjusted according to the detected position of the user in the wireless communication condition adjustment step (S123).

Thus, even when the user is located at a position where the facial feature points cannot be extracted from the facial image relative to the camera 23, it is possible to adjust the imaging conditions such as a focal distance, an angle of view, an imaging direction, and a white balance according to the estimated position of the RF tag T, that is, the position of the user when the position of the RF tag T is estimated. Accordingly, it is possible to increase the possibility of extracting the facial feature points (second facial feature points) from the facial image captured after the adjustment. On the other hand, even when the RF tag T is located at a position where it is difficult to be read by the RF tag reader/writer 22, it is possible to adjust the wireless communication conditions of the RF tag reader/writer 22, such as radio wave output and radio wave radiation direction, according to the detected position of the user, that is, the position of the RF tag T when the position of the user is detected. Accordingly, it is possible for the RF tag reader/writer 22 to increase the possibility of reading the first facial feature points from the RF tag T after the adjustment. Therefore, even when the authentication requires extraction of the facial feature points from the captured image and reading of the RF tag, it is possible to increase situations available for authentication and ensure smooth authentication.

Figure 7:
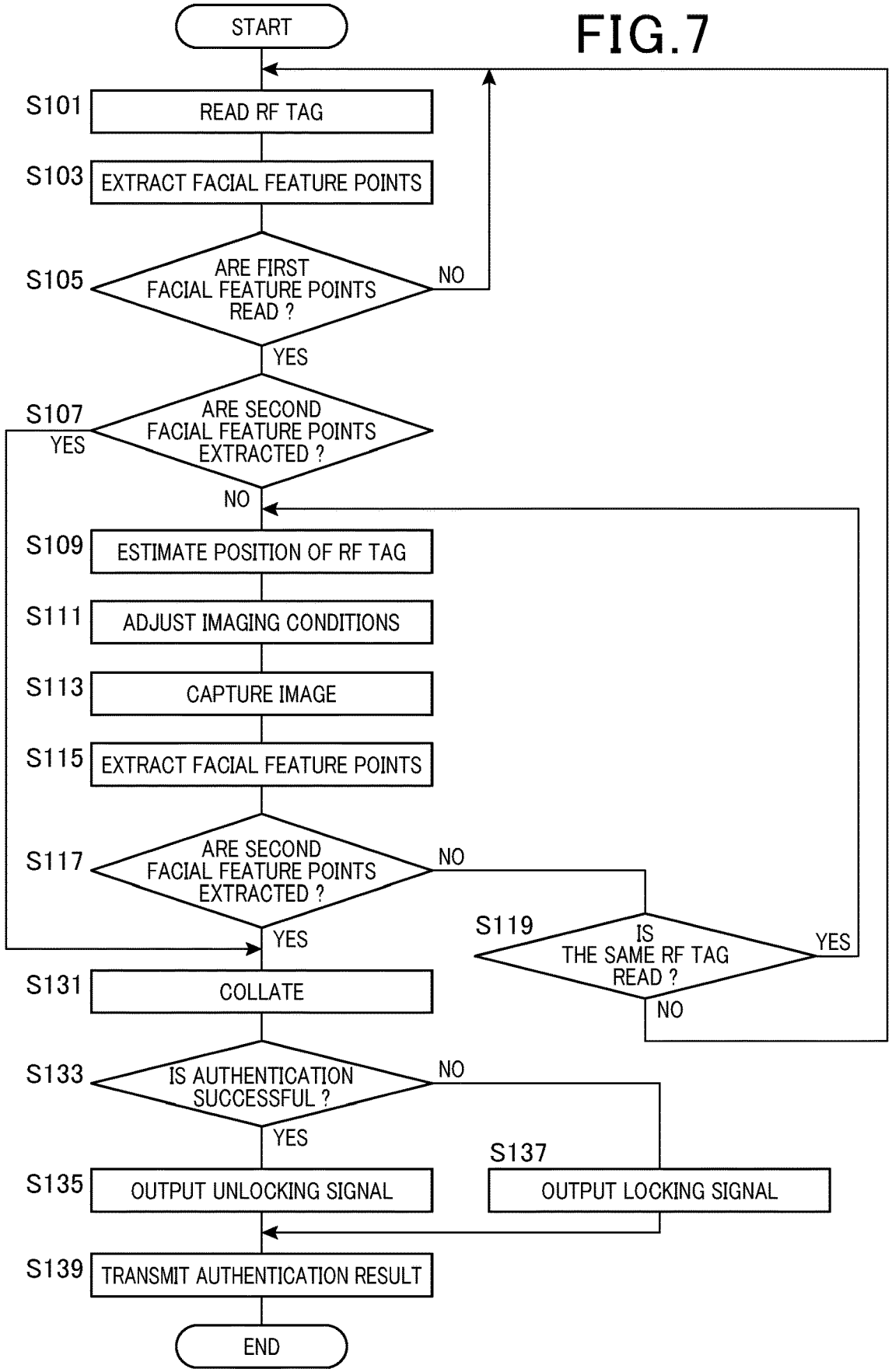
FIG. 7 is a flowchart illustrating a flow of a locking/unlocking procedure performed by a management controller of an access and exit control device according to a first modified example of the first embodiment.

As shown in a flowchart in FIG. 7, according to a first modified example of the present embodiment, the locking/unlocking procedure may also be performed by repeating the above steps S101 and S103 until first facial feature points are read from the RF tag T. If the second facial feature points are not extracted (No in S107) in a state where the first facial feature points are read from the RF tag T (Yes in S105), the steps from step S109 onward are performed. If the second facial feature points are extracted (Yes in S107), the steps from step S131 onward are performed. This eliminates the need of performing the wireless communication condition adjustment in the steps from step S121 onward.

With this configuration as well, when the user is located at a position where the facial feature points cannot be extracted from the facial image relative to the camera 23, it is possible to adjust the imaging conditions such as a focal distance, an angle of view, an imaging direction, and a white balance according to the position of the RF tag T estimated in advance, that is, the position of the user. Accordingly, it is possible to increase the possibility of extracting the facial feature points from the facial image captured after the adjustment.

Figure 8:
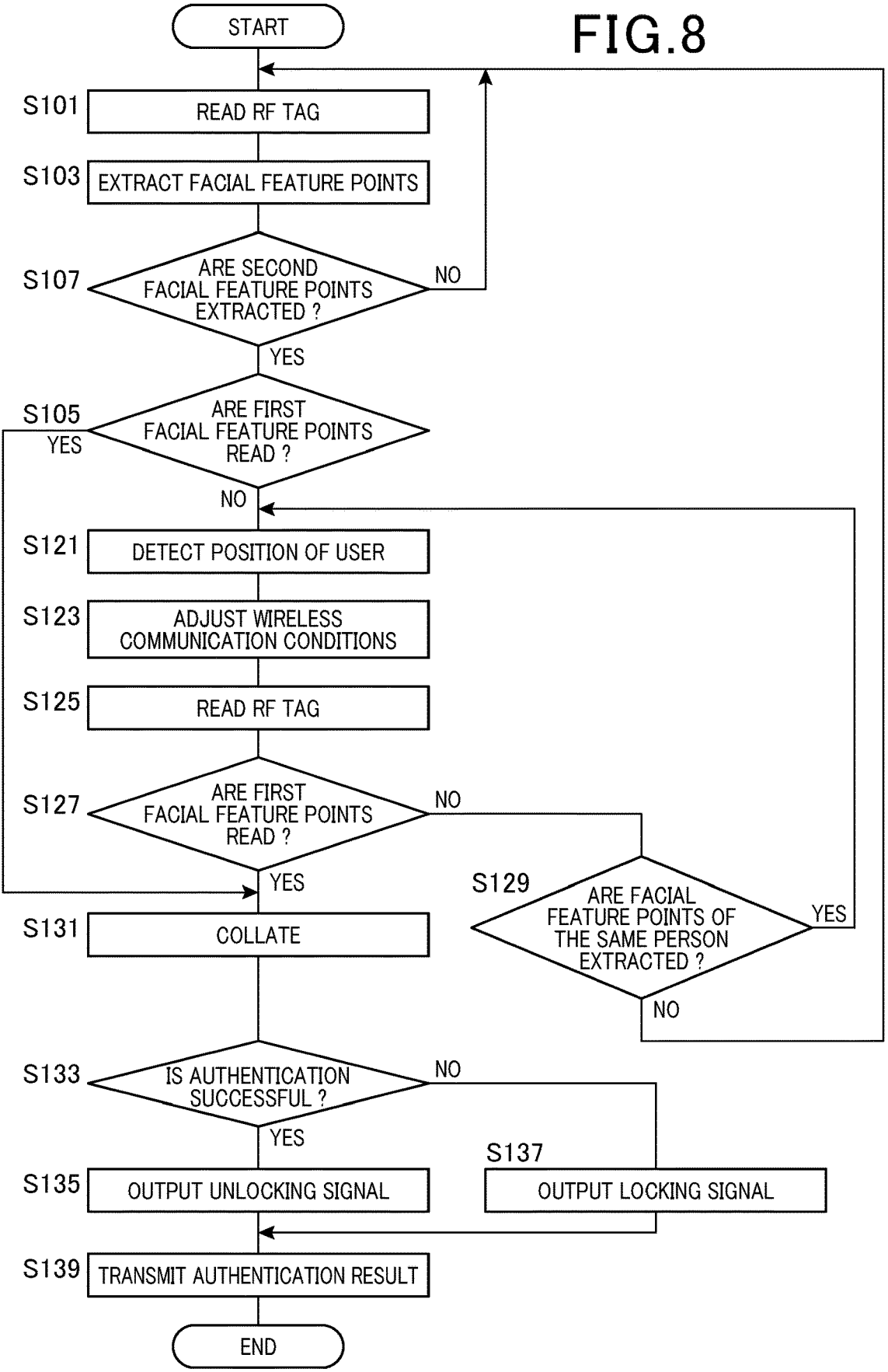
FIG. 8 is a flowchart illustrating a flow of locking/unlocking procedure performed by a management controller of an access and exit control device according to a second modified example of the first embodiment.

Further, as shown in a flowchart in FIG. 8, according to a second modified example of the present embodiment, the locking/unlocking procedure may also be performed by repeating the above steps S101 and S103 until second facial feature points are extracted from the facial image captured by the camera 23. If the first facial feature points are not read from the RF tag T (No in S105) in a state where the second facial feature points are extracted (Yes in S107), the steps from step S121 onward are performed. If the first facial feature points are read from the RF tag T (Yes in S105), the steps from step S131 onward are performed. This eliminates the need of performing the imaging condition adjustment in the steps from step S109 onward.

With this configuration as well, when the RF tag T is located at a position where it is difficult to be read by the RF tag reader/writer 22, it is possible to adjust the wireless communication conditions of the RF tag reader/writer 22, such as radio wave output and radio wave radiation direction, according to the position of the user detected in advance, that is, the position of the RF tag T. Accordingly, it is possible for the RF tag reader/writer 22 to increase the possibility of reading the first facial feature points from the RF tag T after the adjustment.

Second Embodiment

Next, with reference to FIG. 9, the access and exit control system 10 according to a second embodiment of the present invention will be described.

The second embodiment differs from the above first embodiment in that the first facial feature points stored in the RF tag T are updated. The components which are substantially the same as those of the first embodiment are denoted by the same reference signs, and the description thereof will be omitted.

In a system configuration in which the first facial feature points stored in the RF tag T are not updated, authentication tends to gradually become difficult due to aging of the user's face or the like. The above issue of authentication can be solved by regularly updating the first facial feature points stored in the RF tag T. However, this requires preparing a user's facial image for authentication for each update, which is time and effort consuming. Further, since the facial feature points are personal information, confidential matters also need to be managed by a responsible person. In this sense as well, there is a problem that updating work is time and effort consuming.

Therefore, in the present embodiment, when a collation score at the collation step becomes a predetermined threshold or higher, the first facial feature points stored in the RF tag T are overwritten to match the extracted second facial feature points in an updating procedure executed by the control circuit 21a of the management controller 21. In the present embodiment, the predetermined threshold is set to be a value larger than the above specified value, but not limited thereto. For example, the predetermined threshold may be equal to the above specified value.

Specifically, the RF tag T stores two types of first facial feature points written on different dates and times together with each ID number and the date and time of writing for each of the first facial feature points. Therefore, in the locking/unlocking procedure, the collation step (S131) is performed using the first facial feature points that are normal and new from among the two types of first facial feature points read at the step of reading the RF tag. In the updating procedure performed when the collation score at the collation step becomes a predetermined threshold or higher, the first facial feature points that are not used for authentication among the two types of first facial feature points are set as a target to be updated. In addition, the data constituting the first facial feature points can include an error correction code or the like to determine whether or not the data are correct.

Referring to a flowchart shown in FIG. 9, the updating procedure performed by the management controller 21 will be described in detail below.

Figure 9:
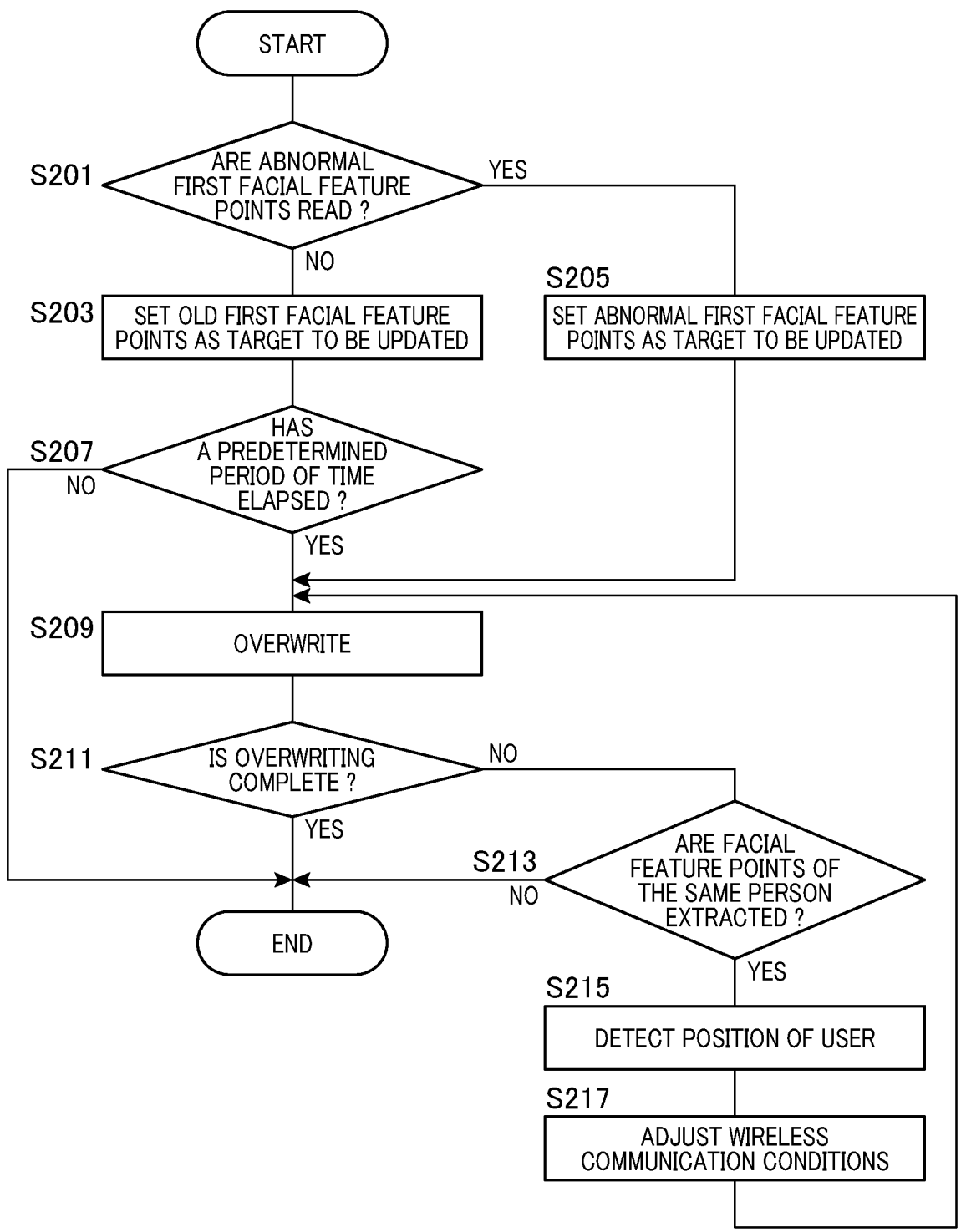
FIG. 9 is a flowchart illustrating a flow of an updating procedure performed by a management controller of an access and exit control device according to a second embodiment.

When the updating procedure is started by the management controller 21 as the collation score at the collation step becomes a predetermined threshold or higher, determination is performed in step S201 in FIG. 9 to determine whether or not abnormal first facial feature points are read from the RF tag T. In this step, if it is determined, by using an error correction code or the like, that two types of normal first facial feature points are read in the step of reading the RF tag (S101 and S125) (No in S201), the first facial feature points with old date and time of writing are set as a target to be updated (S203).

Then, in step S207, determination is performed to determine whether a predetermined period of time has elapsed from the date and time of writing of the first facial feature points set as the target to be updated. If it is determined that the predetermined period of time has not elapsed from the date and time of writing of the first facial feature points set as the target to be updated (No in S207), it is determined that the first facial feature points do not need to be updated, and the updating procedure ends. The above predetermined period of time may be any period, such as one month, half a year or one year.

On the other hand, if it is determined that the predetermined period of time has elapsed from the date and time of writing of the first facial feature points set as the target to be updated (Yes in S207), it is determined that the first facial feature points need to be updated, and overwriting at step S209 is performed. In the step of overwriting at step S209, the first facial feature points set as the target to be updated are overwritten to match the second facial feature points extracted as described above by the RF tag reader/writer 22. Furthermore, in the above overwriting step, the date and time of writing as well as the first facial feature points are also overwritten.

Further, if it is determined that abnormal first facial feature points are read in the above step of reading the RF tag (Yes in S201), the abnormal first facial feature points are set as a target to be updated (S205) and overwritten to match the extracted second facial feature points regardless of the date and time of writing (S209).

When the above overwriting step is complete (Yes in S211), the updating procedure ends. On the other hand, if the writing fails due to a large amount of information of the first facial feature points to be written and the user moving during writing (No in S211), determination is performed at step S213 to determine whether or not the facial feature points of the same person are extracted. If it is determined that the facial feature points of the same person are no longer extracted (No in S213), the updating procedure ends without waiting for the completion of overwriting.

On the other hand, if it is determined that the facial feature points of the same person are extracted (Yes in S213), user position detection at step S215 is performed to detect a position of the user based on the image of the user captured by the camera 23. Subsequently, wireless communication condition adjustment at step S217 is performed to adjust the wireless communication conditions of the RF tag reader/writer 22, specifically, for example, radio wave output, radio wave radiation direction, and the like to the conditions suitable for reading the RF tag T located at the detected position of the user on the assumption that the RF tag T is located at the detected position of the user. Then, while the wireless communication conditions are thus adjusted, the steps from step S209 onward are performed.

As described above, in the access and exit control system 10 according to the present embodiment, when a collation score corresponding to a match rate between the first facial feature points and the second facial feature points becomes a predetermined threshold or higher as a collation result of the collation step, the above updating procedure is started. Thus, the first facial feature points for which a predetermined period of time has elapsed from the date and time of writing are overwritten by the RF tag reader/writer 22 to match the second facial feature points.

As described above, when the collation score becomes the predetermined threshold or higher, the first facial feature points stored in the RF tag T are overwritten by the RF tag reader/writer 22 to match the extracted second facial feature points. Accordingly, the user, the administrator, or the like are not required to perform the updating work, and thus time and effort for updating can be eliminated. In particular, since the second facial feature points having the collation score of a predetermined threshold or higher are reliable as the facial feature points for use in authentication, it is possible to store reliable facial feature points as the first facial feature points in the RF tag T.

Further, since the first facial feature points for which a predetermined period of time has elapsed from the date and time of writing are overwritten to match the second facial feature points, it is possible to prevent the first facial feature points for which a predetermined period of time has not elapsed from the date and time of writing from being taken as a target to be updated, and thus prevent the first facial feature points stored in the RF tag from being updated at each time the collation score becomes a predetermined threshold or higher. Accordingly, unnecessary updating of the first facial feature points can be prevented.

In particular, when the overwriting by the RF tag reader/writer 22 fails (No in S211), wireless communication conditions are adjusted according to the position of the user detected by the user position detecting unit. Accordingly, a success rate of overwriting by the RF tag reader/writer 22 after the adjustment can be increased.

The RF tag T is not limited to have two first facial feature points written therein, and three or more first facial feature points may be written in the RF tag T together with the date and time of writing for each of the first facial feature points. By overwriting the oldest one from among the plurality of first facial feature points to match the second facial feature points, a plurality of patterns of the first facial feature points can be held. In particular, even when overwriting of one first facial feature point fails due to the RF tag T moving to the outside of the communication range of the RF tag reader/writer 22 during updating, authentication can be performed using the other first facial feature points. Therefore, it is possible to prevent authentication from being disabled due to such an overwriting failure. In addition, a plurality of types of first facial feature points are not necessarily written in the RF tag T. Depending on the usage environment such as the one in which overwriting is not likely to fail, the RF tag T may be configured such that one first facial feature point is written.

Third Embodiment

Next, with reference to FIGS. 10 and 11, the access and exit control system 10 according to a third embodiment of the present disclosure will be described.

The third embodiment differs from the first embodiment mainly in that a moving speed of the user is detected, and a timing of opening/closing the door 11 is changed according to the detected moving speed. The components which are substantially the same as those of the first embodiment are denoted by the same reference signs, and the description thereof will be omitted.

Figure 10:
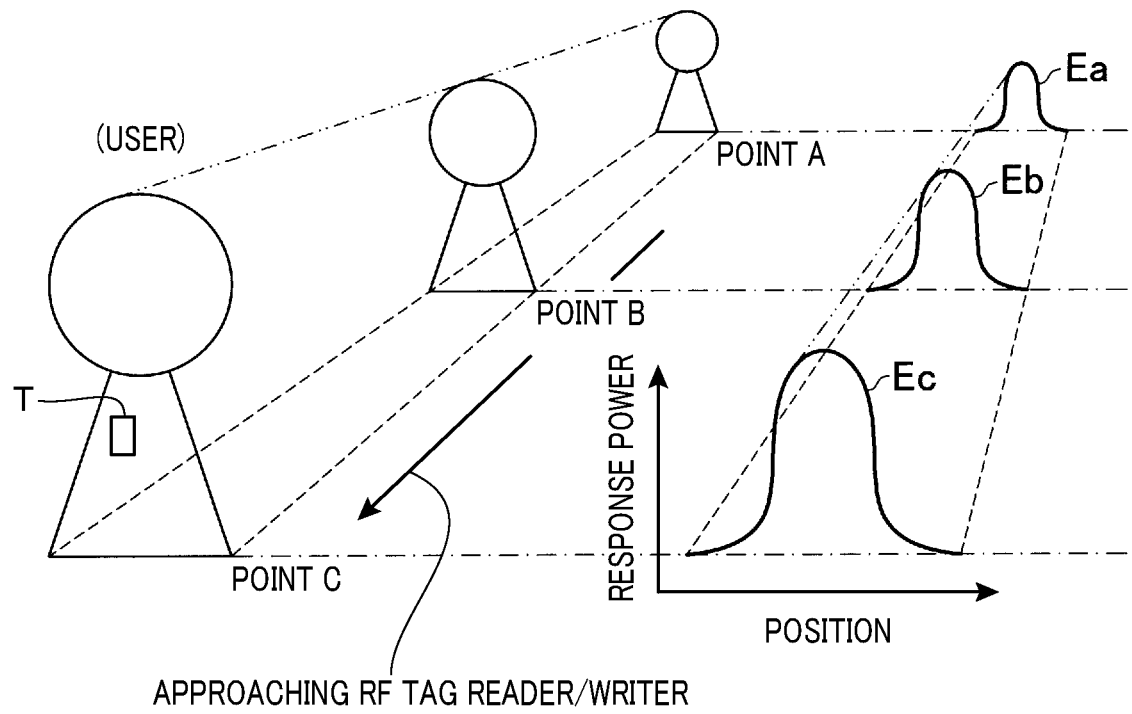
FIG. 10 is a diagram illustrating a relationship between a change in response power of an RF tag and a moving speed of a user in a third embodiment.

FIG. 10 illustrates a response power of the RF tag T of the user who is approaching the RF tag reader/writer 22 via a point A, a point B, and a point C. When a response power of the RF tag T of the user at the point A is denoted as Ea, a response power of the RF tag T of the user at the point B is denoted as Eb, and a response power of the RF tag T of the user at the point C is denoted as Ec, the response power Ea is the smallest and the response power Ec is the largest. That is, the read response power of the RF tag T increases as the RF tag T approaches the RF tag reader/writer 22.

The management controller 21 reads a signal indicating the response power from the RF tag T (FIG. 11, step S221), calculates an amplitude (for example, maximum amplitude) of the response power waveform (waveform indicating the position/electric power intensity) from the signal (step S222), and measures a moving speed of the RF tag T, that is, a moving speed of the user according to a rate of change in response power per unit time (for example, a rate of change in maximum amplitude) (step S223).

Therefore, in the present embodiment, as the moving speed of the user increases, the management controller 21 speeds up an output timing of the unlocking signal which is output when authentication is successful (step S224). Accordingly, the timing of opening/closing the door 11 can be adjusted according to the moving speed of the user relative to the door 11.

It is also possible to measure the moving speed of the user according to a change per unit time in the area occupied by the facial image in the image captured by the camera 23, and speed up the output timing of the unlocking signal output when authentication is successful.

The present invention is not limited to the aforementioned embodiments and modifications, and for example may be embodied as described below.

(1) The imaging conditions adjusted in the imaging condition adjustment step are not limited to a focal distance (focus), an angle of view (viewing angle), an imaging direction, a white balance, and the like. For example, brightness, irradiation direction, or the like of illuminating light of an illumination unit which is separately provided may be used.

(2) In the wireless communication condition adjustment step, for example, a plurality of antennas having different directivity may be prepared, and the wireless communication conditions may be adjusted by changing a combination of the antennas used.

(3) The authentication system according to the present invention is not limited to being applied to the access and exit control system 10 used to permit access to a specific room. The authentication system may also be applied to, for example, a control system that controls an entry and exit gate of a room without a door, a concert hall, or the like, or a system used in a retail store or the like when providing a service that requires authentication.

(4) The locking/unlocking procedure may be configured to make the authentication fail when the number of the RF tags T read by the RF tag reader/writer 22 differs from the number of groups of facial feature points extracted from the image captured by the camera 23 (the number of faces of persons) in order to prevent a person who is not allowed to enter from being accompanied by a person who is allowed to enter.

(5) In the locking/unlocking procedure, when the collation score is a specified value or higher and satisfies at least one of a predetermined location condition, a predetermined time condition, and a predetermined number of times condition, authentication may be determined as being successful.

(6) In the RF tag position estimation step (S109), estimation of the position of the RF tag T is not limited to being performed based on the distance to the RF tag T or the direction of the RF tag T obtained according to the received signal strength indication (RSSI) or a change in the RSSI of a response wave from the RF tag T. For example, the distance to the RF tag T may be detected according to at least the received signal strength of the response wave from the RF tag T without taking into consideration the direction of the RF tag T. In this case, in the imaging condition adjustment step (S111), for example, a focal distance (focus of the camera 23) as an imaging condition of the camera 23 is adjusted according to the distance to the RF tag T detected as described above. That is, the position of the RF tag T is estimated using the distance to the RF tag T detected according to at least the response wave from the RF tag T, and the imaging conditions are adjusted according to the estimated position of the RF tag T. In this configuration as well, when the user is located in the imaging direction of the camera 23, it is possible to increase the possibility of extracting the facial feature points (second facial feature points) from the facial image captured after the above adjustment.

REFERENCE SIGNS LIST

10 . . . Entry and exit control system (authentication system)
11 . . . Door
12 . . . Electric lock
20 . . . Entry and exit control device (authentication device)
21 . . . Management controller (RF tag position estimation unit, wireless communication condition adjustment unit, user position detecting unit, imaging condition adjustment unit, extraction unit, collation unit, authentication unit)
22 . . . RF tag reader/writer (wireless communication unit)
23 . . . Camera (imaging unit)
T . . . RF tag

What is claimed is:

1. An authentication system comprising an authentication device that performs authentication of a user based on information stored in advance in an RF tag carried by the user, wherein
the RF tag stores a facial feature point extracted from a captured image of the user's face in advance as a first facial feature point which constitutes part of the information,
the authentication device includes:
a wireless communication unit configured to wirelessly read and write the information from and to the RF tag;
an RF tag position estimation unit that estimates a position of the RF tag according to a distance to the RF tag detected based on at least a response wave from the RF tag;
an imaging unit that captures an image of the user's face;
an imaging condition adjustment unit that adjusts imaging conditions of the imaging unit;
an extraction unit that extracts a facial feature point as a second facial feature point from an image of the user's face captured by the imaging unit;

a collation unit that collates the first facial feature point read from the RF tag by the wireless communication unit with the second facial feature point extracted by the extraction unit; and an authentication unit that performs authentication of the user based on a collation result from the collation unit, and the imaging condition adjustment unit adjusts the imaging conditions according to a position of the RF tag estimated by the RF tag position estimation unit.

2. The authentication system according to claim 1, wherein, when a collation score corresponding to a match rate between the first facial feature point and the second facial feature point becomes a predetermined threshold or higher as a collation result by the collation unit, the wireless communication unit overwrites the first facial feature point stored in the RF tag to match the second facial feature points extracted by the extraction unit.

3. The authentication system according to claim 2, comprising:

a wireless communication condition adjustment unit that adjusts wireless communication conditions of the wireless communication unit; and a user position detecting unit that detects a position of the user according to an imaging result from the imaging unit, wherein, when overwriting by the wireless communication unit fails, the wireless communication condition adjustment unit adjusts the wireless communication conditions according to a position of the user detected by the user position detecting unit.

4. The authentication system according to claim 2, wherein the RF tag stores date and time of writing at which the first facial feature point is written, and, when the collation score becomes the predetermined threshold or higher, the wireless communication unit overwrites the first facial feature point for which a predetermined period of time has elapsed from the date and time of writing to match the second facial feature point.

5. The authentication system according to claim 4, comprising:

a wireless communication condition adjustment unit that adjusts wireless communication conditions of the wireless communication unit; and a user position detecting unit that detects a position of the user according to an imaging result from the imaging unit, wherein, when overwriting by the wireless communication unit fails, the wireless communication condition adjustment unit adjusts the wireless communication conditions according to a position of the user detected by the user position detecting unit.

6. The authentication system according to claim 4, wherein a plurality of the first facial feature points are written in the RF tag together with the date and time of writing for each of the first facial feature points.

7. The authentication system according to claim 6, comprising:

a wireless communication condition adjustment unit that adjusts wireless communication conditions of the wireless communication unit; and a user position detecting unit that detects a position of the user according to an imaging result from the imaging unit, wherein, when overwriting by the wireless communication unit fails, the wireless communication condition adjustment unit adjusts the wireless communication conditions according to a position of the user detected by the user position detecting unit.

8. An authentication system comprising an authentication device that performs authentication of a user based on information stored in advance in an RF tag carried by the user, wherein the RF tag stores a facial feature point extracted from a captured image of the user's face in advance as a first facial feature point which constitutes part of the information, the authentication device includes:

a wireless communication unit configured to wirelessly read and write the information from and to the RF tag;

a wireless communication condition adjustment unit that adjusts wireless communication conditions of the wireless communication unit;

an imaging unit that captures an image of the user's face;

a user position detecting unit that detects a position of the user according to an imaging result from the imaging unit;

an extraction unit that extracts a facial feature point as a second facial feature point from an image of the user's face captured by the imaging unit;

a collation unit that collates the first facial feature point read from the RF tag by the wireless communication unit with the second facial feature point extracted by the extraction unit; and an authentication unit that performs authentication of the user based on a collation result from the collation unit, and the wireless communication condition adjustment unit adjusts the wireless communication conditions according to a position of the user detected by the user position detecting unit.

9. The authentication system according to claim 8, wherein, when a collation score corresponding to a match rate between the first facial feature point and the second facial feature point becomes a predetermined threshold or higher as a collation result by the collation unit, the wireless communication unit overwrites the first facial feature point stored in the RF tag to match the second facial feature points extracted by the extraction unit.

10. The authentication system according to claim 9, comprising:

a wireless communication condition adjustment unit that adjusts wireless communication conditions of the wireless communication unit; and a user position detecting unit that detects a position of the user according to an imaging result from the imaging unit, wherein, when overwriting by the wireless communication unit fails, the wireless communication condition adjustment unit adjusts the wireless communication conditions according to a position of the user detected by the user position detecting unit.

11. The authentication system according to claim 9, wherein the RF tag stores date and time of writing at which the first facial feature point is written, and, when the collation score becomes the predetermined threshold or higher, the wireless communication unit overwrites the first facial feature point for which a predetermined period of time has elapsed from the date and time of writing to match the second facial feature point.

12. The authentication system according to claim 11, comprising:
   a wireless communication condition adjustment unit that adjusts wireless communication conditions of the wireless communication unit; and
   a user position detecting unit that detects a position of the user according to an imaging result from the imaging unit, wherein,
   when overwriting by the wireless communication unit fails, the wireless communication condition adjustment unit adjusts the wireless communication conditions according to a position of the user detected by the user position detecting unit.

13. The authentication system according to claim 11, wherein
   a plurality of the first facial feature points are written in the RF tag together with the date and time of writing for each of the first facial feature points.

14. The authentication system according to claim 13, comprising:
   a wireless communication condition adjustment unit that adjusts wireless communication conditions of the wireless communication unit; and
   a user position detecting unit that detects a position of the user according to an imaging result from the imaging unit, wherein,
   when overwriting by the wireless communication unit fails, the wireless communication condition adjustment unit adjusts the wireless communication conditions according to a position of the user detected by the user position detecting unit.

15. An authentication method comprising the steps of:
   storing a facial feature point extracted from a captured image of a user's face in an RF tag as a first facial feature point;
   estimating a position of the RF tag according to a distance to the RF tag detected based on at least a response wave from the RF tag;
   adjusting imaging conditions of an imaging unit configured to capture an image of the user's face according to the estimated position of the RF tag;
   extracting a facial feature point as a second facial feature point from an image of the user's face captured by the imaging unit;
   collating the first facial feature point read from the RF tag with the extracted second facial feature point; and
   performing authentication of the user based on a collation result from a collation unit.

* * * * *